April 23, 1935. W. B. KIRBY 1,999,102
LAWN MOWER GRASS CATCHER
Filed June 14, 1933   2 Sheets-Sheet 1

William B. Kirby
INVENTOR
BY Victor J. Evans & Co.
ATTORNEY

April 23, 1935.  W. B. KIRBY  1,999,102
LAWN MOWER GRASS CATCHER
Filed June 14, 1933  2 Sheets-Sheet 2
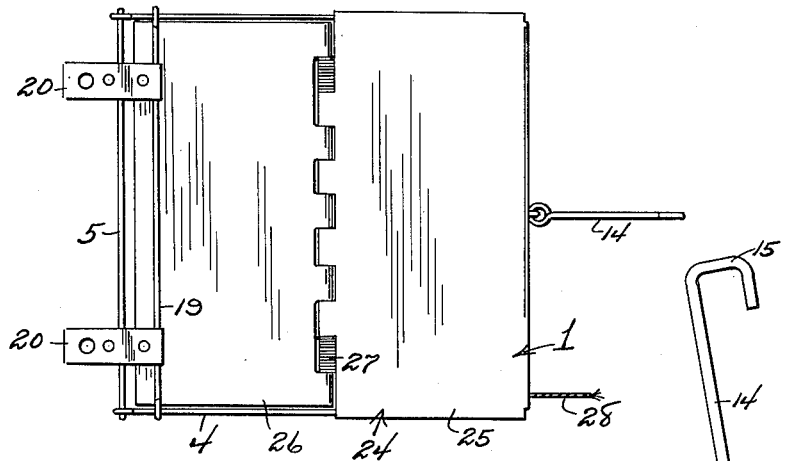
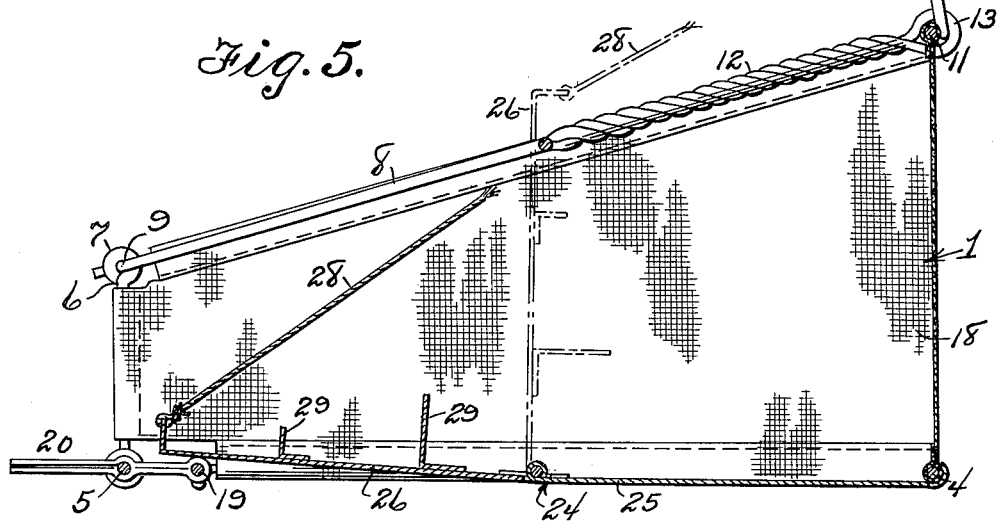
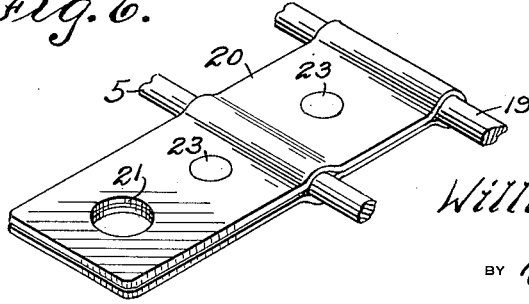
William B. Kirby
INVENTOR
BY Victor J. Evans & Co.
ATTORNEY

Patented Apr. 23, 1935

1,999,102

UNITED STATES PATENT OFFICE 1,999,102

LAWN MOWER GRASS CATCHER

William B. Kirby, Long Beach, Calif.

Application June 14, 1933, Serial No. 675,802

1 Claim. (Cl. 56—199)

This invention relates to grass catchers for lawn mowers and has for the primary object the provision of a device of the above stated character which may be easily and quickly installed to lawn mowers varying in width and is so constructed that a person in normal position of operating the lawn mower may at any time desired cause a throwing or shifting rearwardly of the cut grass within the device, thereby preventing choking of the receiving end of the device with cut grass prior to the device becoming filled to its fullest capacity.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a grass catcher applied to a lawn mower and constructed in accordance with my invention.

Figure 4 is a bottom plan view illustrating the device.

Figure 5 is a sectional view taken on the line 5—5 of Figure 2.

Figure 6 is a fragmentary perspective view illustrating one of the attaching brackets.

Figure 1:
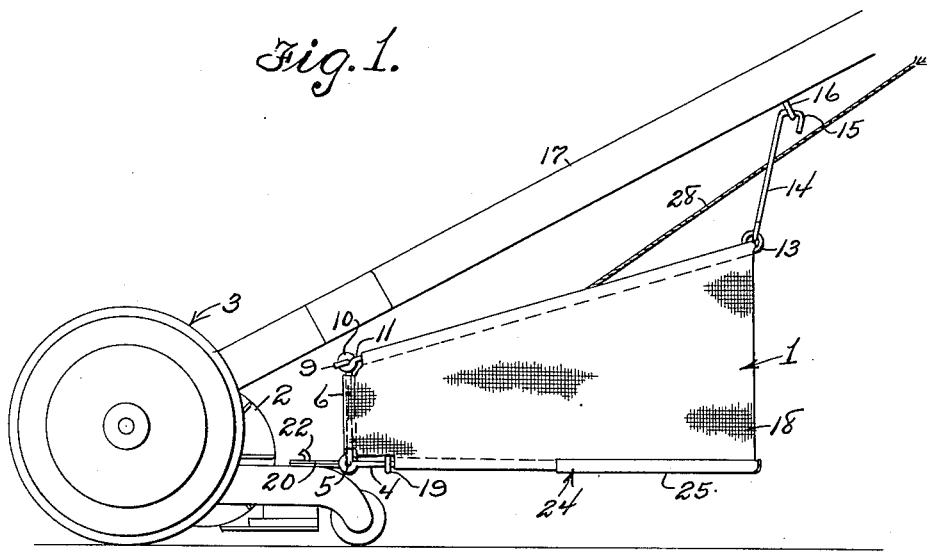
Figures 2, 7:
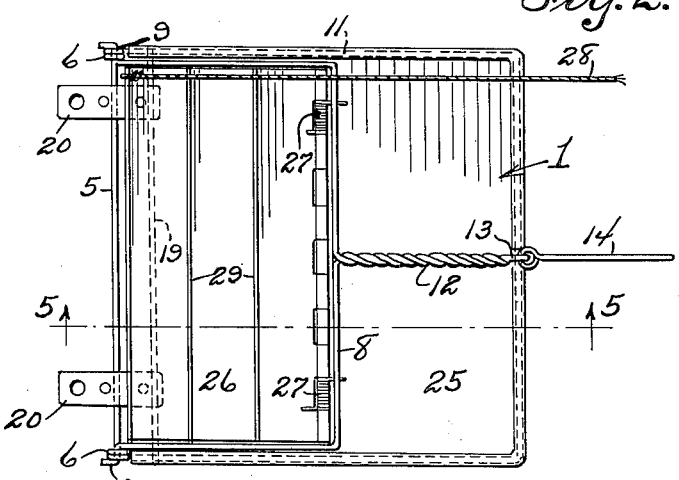
Figure 2 is a top plan view illustrating the grass catcher.
Figure 7 is a fragmentary perspective view illustrating a hinged connection employed in the frame of the device.
Figure 3:
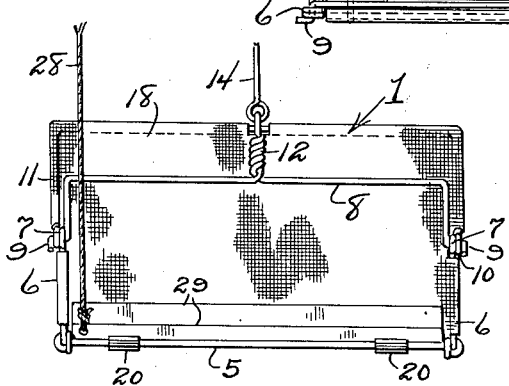
Figure 3 is a front elevation illustrating the same.

Referring in detail to the drawings, the numeral 1 indicates in its entirety a grass catcher supported in rear of the cutting blades 2 of a lawn mower 3 so as to receive the cut grass as thrown rearwardly by the cutting blades.

The grass catcher consists of a bottom or main frame 4 of substantially U-shape having its forward or free end hinged to a connecting bar 5 which is bent to form side arms 6, the upper ends of which are bent to form eyes 7. A substantially U-shaped bracing frame 8 has the ends thereof offset, as at 9, and extend through the eyes 7 also through eyes 10 of a top or auxiliary frame 11 of substantially U-shape and approximately the same size as the main frame. The bracing frame 8 has formed thereon a rearwardly extending arm 12, the free end of which is provided with an eye 13 to receive the auxiliary frame 11 and also receives one end of a supporting element 14, the free end of which is bent in hook formation, as shown at 15, to engage an eye bolt 16 carried by the handle 17 of the lawn mower for the purpose of supporting the rear end of the grass catcher 1.

A suitable fabric 18 is secured to the frames 4 and 11 and the arms 6 to provide side and rear walls to the catcher.

A reinforcing bar 19 connects the sides of the main frame adjacent the connecting bar 5 and said bars 5 and 19 carry spaced brackets 20 provided with openings 21 to receive lugs 22 on the lawn mower 3, thereby supporting the receiving end of the catcher directly in rear of the cutting blades 2 of the lawn mower. Each bracket 20 consists of a plate bent upon itself and receives therebetween the bars 5 and 19 to slidably connect the bracket to said bars. The plate after being bent upon itself and about the bars is riveted together, as shown at 23.

A bottom 24 is provided for the catcher and consists of a rigid section 25 and a movable section 26. The rigid section 25 of the bottom is carried by the main frame 4 and is located at the rear portion of the catcher and has the movable section 26 hinged to its forward edge. Tension springs 27 are carried by the hinge between the sections 25 and 26 for the purpose of urging the section 26 into a substantially horizontal position with the forward portion of the section 26 resting on the reinforcing bar 19 so as to form with the section 25 a complete bottom to the catcher. An operating cable 28 is connected to the forward end of the section 26 and is adapted to extend to the handle 17 of the lawn mower whereby the operator at any time desired may swing the section 26 upwardly into a vertical position, as shown in dotted lines in Figure 5 to shift the cut grass accumulated thereon onto the section 25 of the bottom. Suitable cleats 29 are carried by the section 26.

In operation, the cut grass from the mower falls onto the section 26 of the bottom and the operator after the accumulation of a certain amount of grass on the section 26, pulls the cable 28, swinging the section 26 into a vertical position so as to deposit the cut grass on the section 25 of the bottom and within the rear portion of the catcher. On releasing the cable 28 the tension springs 27 return the section 26 of the bottom into a horizontal position for again receiving cut grass from the mower. The section 26 is prevented from moving beyond a vertical position, as shown in dotted lines in Figure 5, by the reinforcing frame 8.

The catcher when removed from the lawn mower will collapse due to the construction of the frames and their connection with each other so that the device may be stored in a comparatively small space.

While I have shown and described the preferred embodiment of my invention, it will be understood that minor changes in construction, combination and arrangement of parts may be made without departing from the spirit and scope of my invention, as claimed.

Having described the invention, I claim:

A grass catcher comprising a substantially U-shaped main frame having its ends bent to provide eyes, a bar extending through said eyes and having angularly related portions to provide vertically arranged arms terminating in eyes, a substantially U-shaped reinforcing frame positioned above the main frame and having its ends offset and extending through the last-named eyes, an upper substantially U-shaped frame journaled to the ends of the reinforcing frame, a connecting member fixed to the reinforcing frame and connected to the upper frame, a bottom for the main frame and including movable and non-movable sections hinged to each other, fabric secured to the main and upper frames to provide rear and side walls for the bottom, means for connecting the bar to a lawn mower, a supporting means for connecting said connecting member to a handle of the lawn mower, and an operating means connected to the movable section of the bottom to swing said movable section against the reinforcing frame.

WILLIAM B. KIRBY.